United States Patent [19]

Minoura et al.

[11] Patent Number: 5,146,365

[45] Date of Patent: Sep. 8, 1992

[54] SCREEN AND IMAGE DISPLAY APPARATUS WHICH MINIMIZES THE EFFECTS OF RE-REFLECTED INCIDENT LIGHT

[75] Inventors: Nobuo Minoura; Haruyuki Yanagi; Hideaki Mitsutake, all of Yokohama; Katsumi Kurematsu, Kawasaki, all of Japan

[73] Assignee: Canon Kabushiki Kaisha, Tokyo, Japan

[21] Appl. No.: 442,722

[22] Filed: Nov. 29, 1989

[30] Foreign Application Priority Data

Nov. 29, 1988 [JP] Japan ............................. 63-301356

[51] Int. Cl.$^5$ ...................... G02B 3/08; G02B 27/00; G03B 21/60
[52] U.S. Cl. ................................ 359/619; 359/449; 359/457; 359/460; 359/742
[58] Field of Search ............... 350/452, 168, 322, 117, 350/122, 123, 124, 125, 127, 128, 167; 353/74, 75, 76, 77, 78, 79, 38; 359/615, 893, 443, 448, 449, 450, 451, 454, 455, 619, 621, 622, 741, 742, 456, 457

[56] References Cited

U.S. PATENT DOCUMENTS

| | | | |
|---|---|---|---|
| 2,441,747 | 5/1948 | Beshgetoor | 76/107 |
| 2,510,344 | 6/1950 | Law | 88/28 |
| 3,848,980 | 11/1974 | Plummer | 350/128 X |
| 3,972,593 | 8/1976 | Appledorn | 350/211 |
| 3,982,822 | 9/1976 | Conder | 350/211 |
| 4,076,384 | 2/1978 | Deml et al. | 350/127 X |
| 4,147,408 | 4/1979 | Plummer | 350/128 |
| 4,152,047 | 5/1979 | Inoue | 350/122 |
| 4,173,399 | 11/1979 | Yevick | 353/78 |
| 4,374,609 | 2/1983 | Lange | 350/128 |
| 4,391,495 | 7/1983 | Mazurkewitz | 350/452 |
| 4,439,027 | 3/1984 | Shioda et al. | 353/77 |
| 4,458,993 | 7/1984 | Kempf | 353/82 |
| 4,468,092 | 8/1984 | Inoue et al. | 350/128 |
| 4,482,206 | 11/1984 | Van Breemen | 350/128 |
| 4,509,822 | 4/1985 | Clausen | 350/128 |
| 4,512,631 | 4/1985 | Vanbreemen | 350/123 X |
| 4,525,029 | 6/1985 | Inoue et al. | 350/128 |
| 4,550,977 | 11/1985 | Inoue et al. | 350/128 |
| 4,666,248 | 5/1987 | van de Ven | 350/128 |
| 4,674,836 | 6/1987 | Yata et al. | 350/128 |
| 4,701,020 | 10/1987 | Bradley, Jr. | 350/128 |
| 4,708,435 | 11/1987 | Yata et al. | 353/77 |
| 4,721,361 | 1/1988 | van de Ven | 350/128 |
| 4,725,134 | 2/1988 | Ogino | 353/74 |
| 4,919,518 | 4/1990 | Ogino et al. | 350/128 |

FOREIGN PATENT DOCUMENTS

| | | |
|---|---|---|
| 1487841 | 5/1967 | France .............................. 350/124 |
| 60-61738 | 4/1985 | Japan . |
| 692569 | 6/1953 | United Kingdom . |

Primary Examiner—Bruce Y. Arnold
Assistant Examiner—David R. Parsons
Attorney, Agent, or Firm—Fitzpatrick, Cella, Harper & Scinto

[57] ABSTRACT

A back projection type screen having a screen portion to be disposed at a position whereat an image projected from image projector means is formed, the screen portion being formed by at least one transparent sheet, the screen portion having a vertical direction and a horizontal direction in parallel to the surface of the transparent sheet, and a light diffusing portion formed on the light beam incidence side surface of the transparent sheet which is next to the light beam incidence side of the screen portion, the light diffusing portion transmitting an incident light therethrough and also diffusing reflected light in the vertical direction and the horizontal direction. The specification also discloses an image display apparatus using such screen.

14 Claims, 4 Drawing Sheets

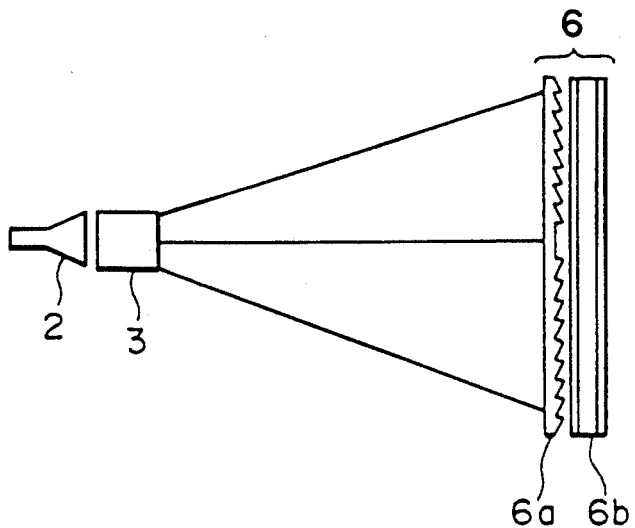
FIG. 1
PRIOR ART
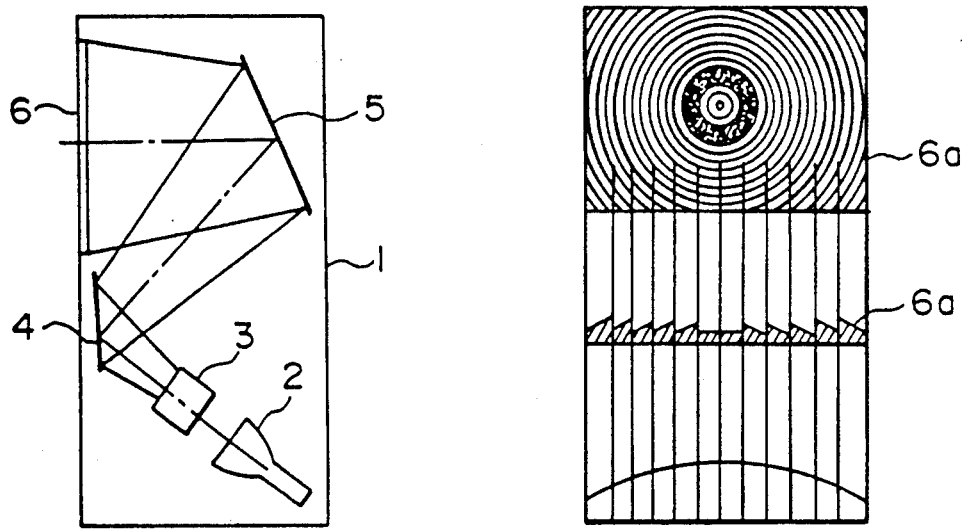
FIG. 2
PRIOR ART
FIG. 3
PRIOR ART

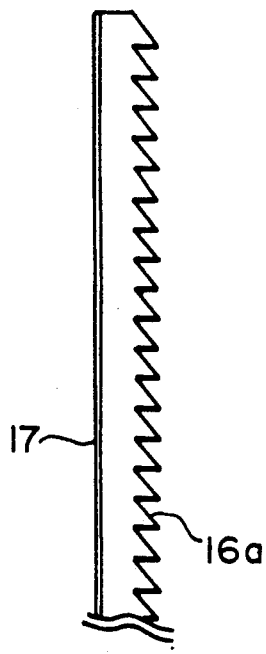
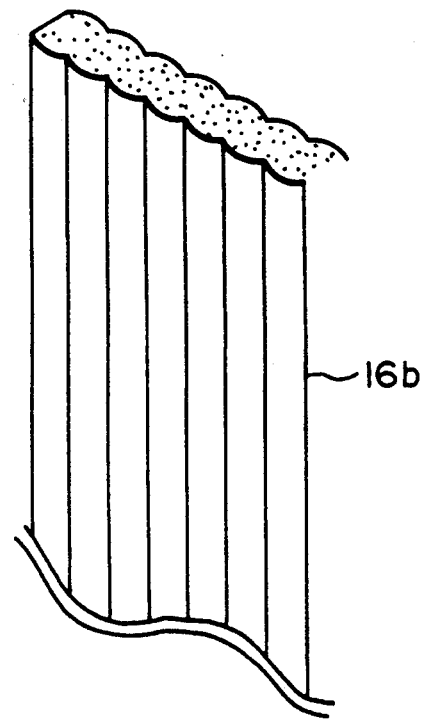
F I G. 6   F I G. 7
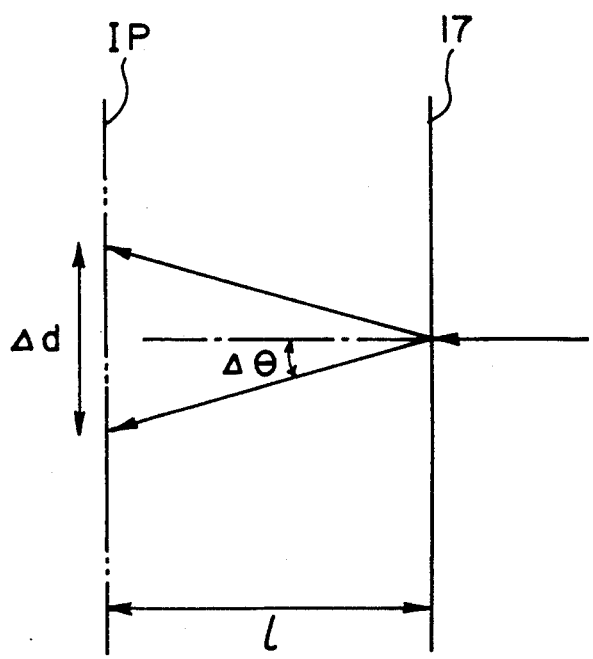
F I G. 8

SCREEN AND IMAGE DISPLAY APPARATUS WHICH MINIMIZES THE EFFECTS OF RE-REFLECTED INCIDENT LIGHT

BACKGROUND OF THE INVENTION

This invention relates to a back projection type screen in which the adverse effect of the reflection of image light by the light incidence side surface of the screen is eliminated and a back projection type image display apparatus using the same.

In a back projection type image display apparatus according to the prior art, as schematically shown in FIG. 1 of the accompanying drawings, the image light from a display device 2 such as a CRT is expanded and projected onto a screen 6 through a projection lens 3. The screen 6 is usually comprised of a combination of a Fresnel lens sheet 6a as shown in FIG. 3 of the accompanying drawings and a lenticular lens sheet 6b. The Fresnel lens is formed by making a plano-convex lens shown at the bottom of FIG. 3 into a thin sheet, and carving variations in the curvature of the lens concentrically flatly.

The construction of FIG. 1 is actually housed in a cabinet 1 as shown in FIG. 2 of the accompanying drawings, and the image light has its optical path bent by reflecting mirrors 4 and 5 and is projected onto the screen 6. Heretofore, acrylic resin or the like has been used for the screen 6 and generally, the Fresnel lens sheet 6a whose incidence side surface is a non-lens surface, i.e., a planar surface, is disposed on the light incidence side, and the lenticular lens sheet 6b with a diffusing agent mixed therewith is disposed on the emergence side.

However, in the example of the prior art as described above there is the phenomenon that a small percentage of image light reflection occurs on the incidence side non-lens surface or the Fresnel lens surface of the Fresnel lens sheet 6a and this reflected light impinges on the reflecting mirrors 4 and 5 and returns to the screen 6 again.

Thus, the reflected light in the particularly intense portion of the light becomes intense, and when it is re-reflected to the dark portion of the screen, band-like or round images of R (red), G (green) and B (blue) appear (in the case of the three R, G and B tubes type) or the re-reflected light becomes flared and the quality of image is remarkably spoiled. Particularly, in the construction of an image display apparatus of the oblique incidence type for making the depth of the cabinet 1 small (the type in which an image light is projected onto a screen at an angle), this phenomenon is difficult to neglect.

Among the conventional screens, there is known one in which a plurality of cylindrical lenses are arranged on the light beam incidence surface of the sheet next to the light beam incidence side in a direction perpendicular to the generating line to thereby form a lenticular lens surface. In this case, this lenticular lens surface diffuses reflected light in one direction, but the reflected light is not diffused in a direction perpendicular to the direction of diffusion and therefore, if this reflected light is incident, for example, on the reflecting mirrors 4 and 5 and is again incident on the screen 6, it is diffused and its intensity weakens, but this also has been a cause for spoiling the quality of image as ghost or flare light extending in the direction of diffusion.

SUMMARY OF THE INVENTION

In view of the above-noted disadvantages peculiar to the prior art, it is a first object of the present invention to provide a back projection type screen in which the reflected light of image light on the first incidence surface of the screen is prevented to the utmost from being again incident on the screen to thereby cause an adverse effect such as the deterioration of the quality of image and an image display apparatus using such screen.

Other objects of the present invention will become apparent from the following detailed description of an embodiment of the present invention.

BRIEF DESCRIPTION OF THE DRAWINGS

FIG. 1 schematically shows the construction of an example of the prior art.

FIG. 2 shows the entire construction of the example of the prior art.

FIG. 3 is an illustration of a Fresnel lens sheet according to the prior art.

FIG. 6 is an illustration of a Fresnel lens sheet according to said embodiment.

FIG. 7 is an illustration of a double lenticular lens sheet according to said embodiment.

FIG. 8 illustrates the diffusing power of a diffusing layer according to said embodiment.

DESCRIPTION OF THE PREFERRED EMBODIMENT

In order to achieve the above object, in a back projection type screen or an image display apparatus according to an embodiment of the present invention which will hereinafter be described, a rough surface or a thin diffusing layer formed of delustering lacquer is provided on that surface of the screen which is most adjacent to the light incidence side so that image light incident on the screen may be diffused in vertical and horizontal directions.

Since a thin diffusing layer or the like is thus provided on that surface of the screen which is next to the incidence side, reflected light is diffused in vertical and horizontal directions even when an intense light impinges on a portion of the screen, and it will only become an almost negligible ghost or flare even if it impinges on a reflecting mirror and returns to the screen again.

There is also a light beam which is transmitted through the surface next to the incidence side and reflected by the other surface and returns to the reflecting mirror, but such a light beam is also diffused in vertical and horizontal directions when it is transmitted twice through the surface next to the incidence side before and after it is reflected and therefore, ghost or flare is also greatly mitigated. That is, if at least the surface next to the incidence side is endowed with two-dimensional diffusing power, elimination of ghost or flare will become possible.

The diffusing layer or the like of the present invention has only a very weak diffusing function as compared with the diffusing portion of an image forming unit and therefore, the reduction in the resolution of the picture plane or the transmittance of light caused by the original image light poses no problem in practical use.

Figure 5:
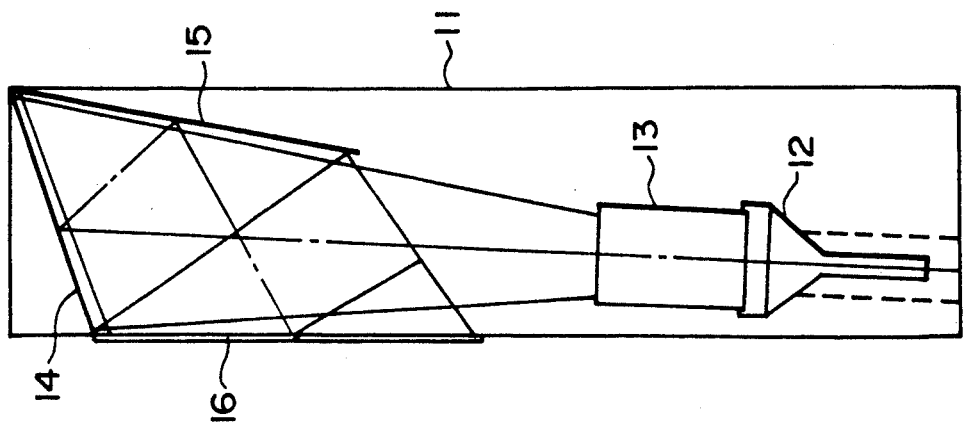
FIG. 5 shows the entire construction of said embodiment.
Figure 4:
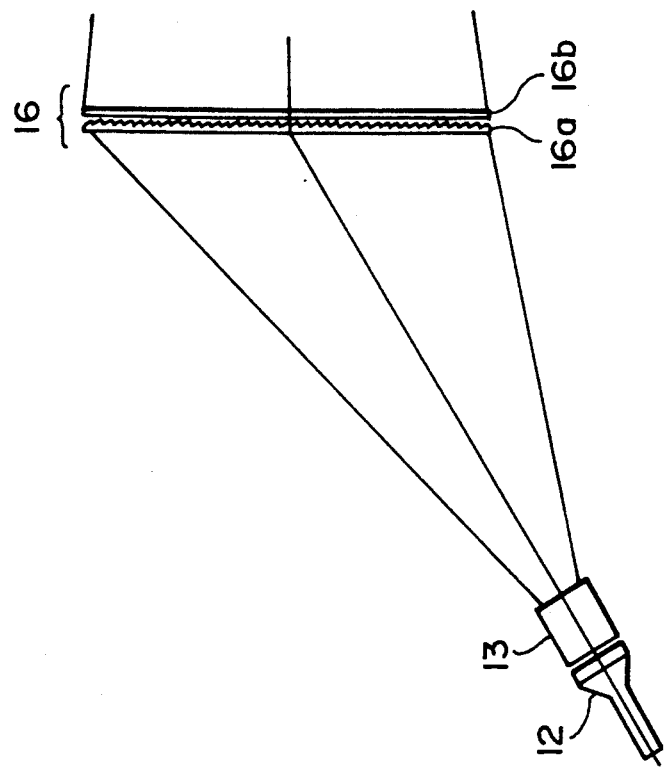
FIG. 4 schematically shows the construction of an embodiment of the present invention.

An embodiment of the present invention is shown in FIGS. 4 and 5.

In these figures, the reference numeral 11 designates the cabinet of a back projection type image display apparatus of the oblique incidence type, the reference numeral 12 denotes a display device such as a CRT, the reference numeral 13 designates a projection lens, the reference numerals 14 and 15 denote reflecting mirrors, and the reference numeral 16 designates a screen. FIG. 4 shows the optical path except for the reflecting mirrors 14 and 15, but optically, FIGS. 4 and 5 are equal to each other.

The screen 16 comprises a sheet 16a in which, as shown in FIG. 6, a thin diffusing layer 17 is provided on the light incidence side surface and an eccentric Fresnel lens, in which the center of a group of prisms extending in a concentric curve-like or arcuate form deviates from the center of the screen, is formed on the light emergence side surface, and a double lenticular lens sheet 16b in which, as shown in FIG. 7, vertical type (vertically extending) lenticular lenses are formed on the opposite surfaces and a diffusing agent is mixed therewith.

Thus, an image cast on the tube surface of the CRT 12 is expanded and projected by the projection lens 13, and is imaged on the screen 16 via the reflecting mirrors 14 and 15. Herein, the light projected onto the screen 16 is reflected several degrees by the incidence surface and Fresnel lens surface of the Fresnel lens sheet 16a, but since the diffusing layer 17 is provided on the incidence surface, the reflected light on this surface becomes a diffused light diffused in the vertical direction in FIG. 6 and a direction perpendicular to the plane of the drawing sheet of FIG. 6 (the horizontal direction), and does not form an image on the screen 16 even if it is re-reflected by the mirror surfaces of the reflecting mirrors 14 and 15. Accordingly, no ghost or flare is created on the screen 16 and a clear-cut image can be obtained on the screen 16.

When the diffusing power of the diffusing layer 17 is $\Delta\theta$ (a half-value angle) [rad] and the distance from the incidence surface to the last image forming plane IP (herein, the emergence surface of the double lenticular lens sheet 16b) is l [mm], the amount of reduction $\Delta d$ [mm] in the resolving power by the diffusing layer 17 can be expressed as $$\Delta d \approx 2l \Delta\theta$$

as can be seen from FIG. 8. When the necessary resolving power required of the image is d [mm], $d \geq \Delta d$ is the condition. Accordingly, $$\Delta\theta \approx \frac{\Delta d}{2l} \leq \frac{d}{2l} \quad (1)$$

This is the condition under which the diffusing layer 17 does not reduce the resolution of the picture plane by the original image light.

Also, the diffusing power $\Delta\theta$ is set so that the reflected light which is again incident becomes sufficiently weak relative to the original image light. When the contrast ratio of the image light/the re-incident light required at this time is C and the reflectance by the entire inner surface of the screen is R and the shortest distance of the re-incident light from after it is reflected by the diffusing layer until it is incident on the last image forming plane IP is L(mm) and the illuminating areas of the image light and the re-incident light from the same point on the diffusing surface are $\Delta S_1$ and $\Delta S_2$, respectively, $$C \leq \frac{\Delta S_2}{R \Delta S_1}$$

is the condition. With the case of an illuminating area of minute size corresponding to the necessary resolving power required of the image being taken into consideration, $\Delta S_1$ is as follows:

$$\Delta S_1 = \frac{\pi}{4} d^2$$

Also, $\Delta S_2$ is as follows:

$$\Delta S_2 = \pi \cdot (L \cdot \tan \Delta\theta)^2 \approx \pi \cdot L^2 \cdot \Delta\theta^2$$

Consequently, the aforementioned expression becomes $$C \leq \frac{\Delta S_2}{R \Delta S_1} = \frac{4L^2 \Delta\theta^2}{R d^2}$$

and there is derived the following expression which represents the minimum necessary diffusing power:

$$\frac{d}{2L} \sqrt{CR} \leq \Delta\theta \quad (2)$$

Assuming a large picture plane of the order of 50 inches (or greater), the necessary resolving power d is of the order of 0.5 mm and the necessary contrast is of the order of 100 and therefore, from the expressions (1) and (2), $$\frac{2.5}{L} \sqrt{R} \leq \Delta\theta \leq 0.25 \frac{1}{l} \text{ [rad]}$$

is an appropriate condition as the diffusing power.

Figure 9:
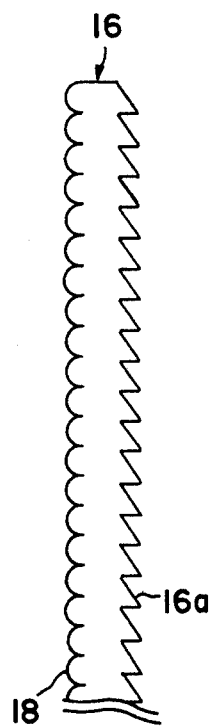
FIG. 9 is an illustration of a modified Fresnel lens sheet according to said embodiment.

Instead of the diffusing layer 17 according to the aforedescribed embodiment, a fly-eye lens surface 18 may be provided on the light incidence side surface of the screen 16 as shown in FIG. 9. The fly-eye lens surface also has the function of diffusing reflected light in vertical and horizontal directions.

According to the present invention, as described above, the adverse effect of the reflection on the re-incidence side surface of the screen is eliminated, and even in a back projection type image display apparatus using a reflecting mirror therein, a ghost image or flare caused by the re-reflection by this reflecting mirror is prevented and an improvement in the quality of image is achieved.

What is claimed is:

1. An image displaying apparatus, comprising:
   an image generator for generating an image;
   a projection optical system for projecting the image with a light beam from said image generator, said projection optical system including a reflecting mirror for reflecting the light beam; and
   a screen for receiving the image, said screen including a first sheet having a first surface facing said reflecting mirror, with diffusing means being formed on said first surface so as to diffuse a portion of the light beam incident thereon a first time, which light beam is reflected by said first surface and reflected again by said reflecting mirror to be incident on said first surface a second time.

2. An image displaying apparatus according to claim 1, wherein an optical axis of said projection optical system is inclined with respect to an axis perpendicular to said screen.

3. An image displaying apparatus according to claim 1, wherein said diffusing means comprises a layer for reflecting and diffusing the beam formed on said first surface of said first sheet.

4. An image displaying apparatus according to claim 10, wherein a Fresnel lens having an optical axis is formed on a second surface opposed to said first surface of said first sheet.

5. An image displaying apparatus according to claim 4, wherein said screen has a second sheet having a lenticular lens and arranged on a side opposite from said reflecting mirror with respect to said first sheet.

6. An image displaying apparatus according to claim 4, wherein the optical axis of said Fresnel lens is deviated from a center of said first sheet so that a principal ray of the light beam is deflected in a predetermined direction.

7. An image displaying apparatus according to claim 1, wherein said diffusing means comprises a fly-eye lens formed on said first surface of said first sheet.

8. An image displaying apparatus, comprising:
an image generator for generating an image;
a projection optical system for projecting the image with a light beam from said image generator, said projection optical system including a reflecting mirror for reflecting the light beam; and
a screen for receiving said image, said screen including a first sheet which has a first surface facing said reflecting mirror and a second surface facing away from said reflecting mirror, with a Fresnel lens formed on said second surface and diffusing means being formed on said first surface so as to diffuse a portion of the light beam incident thereon a first time, which light beam is reflected by said first surface and reflected again by said reflecting mirror to be incident on said first surface a second time.

9. An image displaying apparatus according to claim 8, wherein an optical axis of said projection optical system is inclined with respect to an axis perpendicular to said screen.

10. An image displaying apparatus according to claim 9, wherein an optical axis of said Fresnel lens is deviated from a center of said first sheet so that a principal ray of the light beam is deflected in a predetermined direction.

11. An image displaying apparatus according to claim 10, wherein said screen has a second sheet having a lenticular lens and is arranged on a side opposite from said reflecting mirror with respect to said first sheet.

12. An image displaying apparatus according to claim 11, wherein said diffusing means comprises a layer for reflecting and diffusing the light beam formed on said first surface of said first sheet.

13. An image displaying apparatus according to claim 9, wherein said diffusing means comprises a fly-eye lens formed on said first surface of said first sheet.

14. An image displaying apparatus, comprising:
an image generator for generating an image;
a projection optical system for projecting the image with a light beam from said image generator, said projection optical system including a reflecting mirror for reflecting the light beam; and
a screen for receiving the image, an axis perpendicular to said screen being inclined with respect to an optical axis of said projection optical system, said screen having a first sheet and a second sheet on which a lenticular lens is formed on a surface thereof in succession from said reflecting mirror, said first sheet having a first surface facing said reflecting mirror and a second surface facing away from said reflecting mirror, with a Fresnel lens being formed on said second surface and diffusing means being formed on said first surface so as to diffuse a portion of the light beam incident thereon a first time, which light beam is reflected by said first surface and reflected again by said reflecting mirror to be incident on said first surface a second time.

* * * * *

UNITED STATES PATENT AND TRADEMARK OFFICE
CERTIFICATE OF CORRECTION

PATENT NO. : 5,146,365
DATED : September 8, 1992
INVENTOR(S) : Nobuo Minoura, et al.

It is certified that error appears in the above-identified patent and that said Letters Patent is hereby corrected as shown below:

On the title page:

[30] FOREIGN APPLICATION PRIORITY DATA:

Insert:  Nov. 24, 1989  [JP]  Japan ............. 01-305056.

[57] ABSTRACT:

Line 4, "means" should be deleted.
   Line 7, "in" should be deleted.

COLUMN 5:

Line 14, "10," should read --3,--.

Signed and Sealed this

Nineteenth Day of October, 1993

Attest:

BRUCE LEHMAN

*Attesting Officer*   *Commissioner of Patents and Trademarks*